(12) United States Patent
Nikander et al.

(10) Patent No.: US 10,723,589 B2
(45) Date of Patent: Jul. 28, 2020

(54) ELEVATOR

(71) Applicant: KONE Corporation, Helsinki (FI)

(72) Inventors: Juhamatti Nikander, Helsinki (FI); Olli Pokkinen, Helsinki (FI)

(73) Assignee: KONE CORPORATION, Helsinki (FI)

( * ) Notice: Subject to any disclaimer, the term of this patent is extended or adjusted under 35 U.S.C. 154(b) by 444 days.

(21) Appl. No.: 15/637,101

(22) Filed: Jun. 29, 2017

(65) Prior Publication Data
US 2018/0057309 A1    Mar. 1, 2018

(30) Foreign Application Priority Data

Aug. 29, 2016  (EP) .................................... 16186126

(51) Int. Cl.
*B66B 5/00*   (2006.01)
*B66B 1/32*   (2006.01)
(Continued)

(52) U.S. Cl.
CPC .............. *B66B 5/0025* (2013.01); *B66B 1/32* (2013.01); *B66B 5/0093* (2013.01); *B66B 5/027* (2013.01);
(Continued)

(58) Field of Classification Search
CPC ....... B66B 5/0025; B66B 1/32; B66B 5/0093; B66B 5/027
(Continued)

(56) References Cited

U.S. PATENT DOCUMENTS 5,582,275 A * 12/1996 Arnold .................. B60T 13/741
                                                    188/138
6,732,838 B1 * 5/2004 Okada ...................... B66B 1/30
                                                    187/290
(Continued)

FOREIGN PATENT DOCUMENTS

CN      105355821 A    2/2016
EP      1 591 406 B2   7/2016

*Primary Examiner* — David S Warren
(74) *Attorney, Agent, or Firm* — Birch, Stewart, Kolasch & Birch, LLP

(57) ABSTRACT

The invention relates to an elevator comprising an elevator control having a motor drive of an elevator motor driving an elevator car on an movement path, which motor drive comprising a frequency converter with a rectifier bridge designed to be connected to mains, a converter bridge for feeding the elevator motor and an intermediate DC circuit located in-between, the elevator further comprising a brake drive for supplying energy to at least two motor brakes with the brake drive being connected to the intermediate DC circuit as well as an emergency power supply battery designed to allow safe release of passengers in case of a power outage. According to the invention the battery is connected to the intermediate DC circuit, and the elevator control has a measuring circuit connected to the intermediate DC circuit and the elevator control has a battery testing module which is configured to apply a defined load to the battery and to measure the voltage of the DC circuit for a defined time period. The battery testing module comprises a comparator for comparing the measured voltage with at least one stored first threshold value, whereby the elevator control is configured to issue a replacement signal for the battery dependent on the signal of the comparator.

20 Claims, 2 Drawing Sheets

Figure 1:
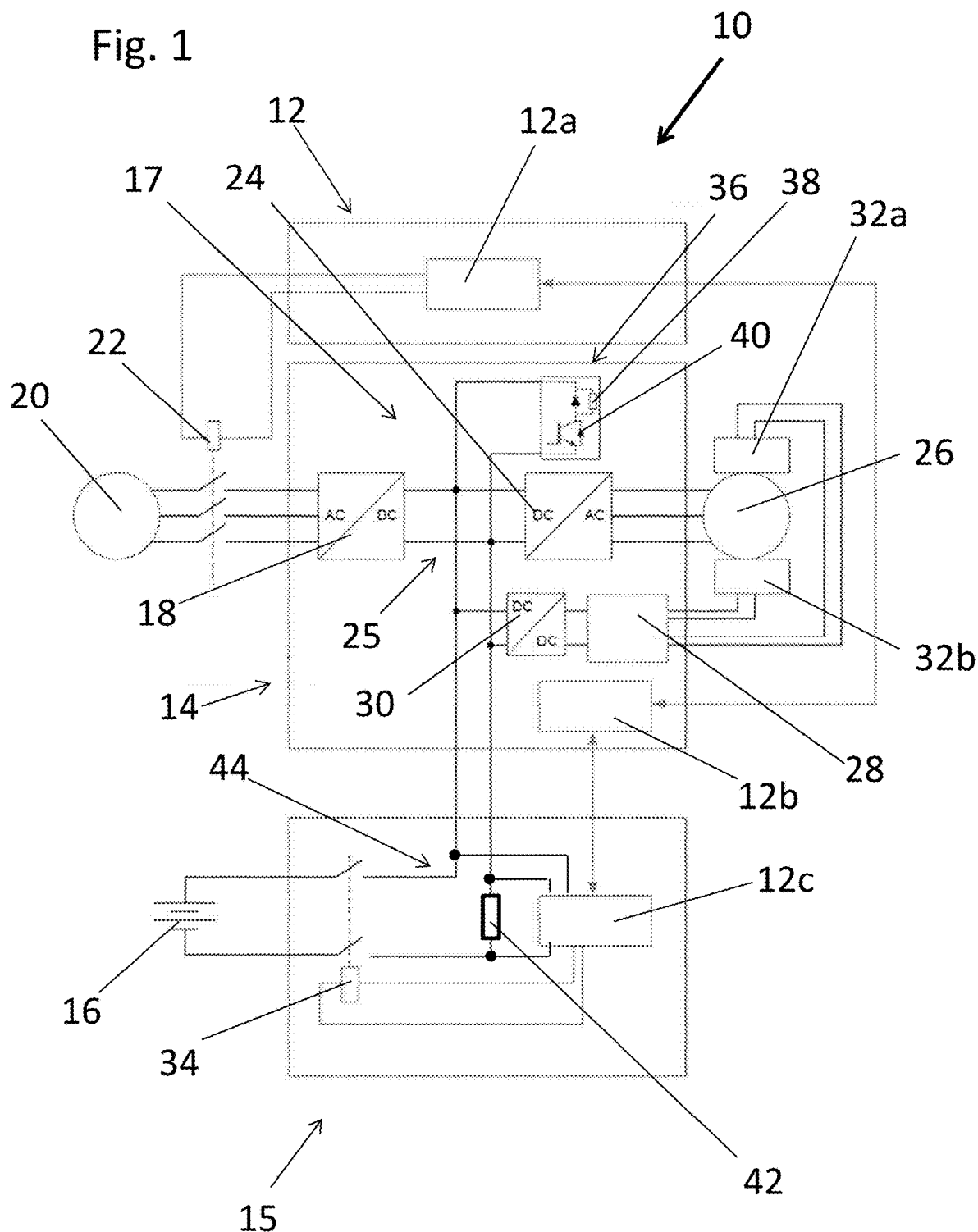

(51) Int. Cl.
*B66B 5/02* (2006.01)
*B66B 9/00* (2006.01)
*B66B 15/04* (2006.01)

(52) U.S. Cl.
CPC ............... *B66B 9/00* (2013.01); *B66B 15/04* (2013.01); *Y02B 50/142* (2013.01)

(58) Field of Classification Search
USPC ........................................................ 187/290
See application file for complete search history.

(56) References Cited

U.S. PATENT DOCUMENTS

| | | | | |
|---|---|---|---|---|
| 7,650,968 | B2* | 1/2010 | Oesterle | B66B 5/021 |
| | | | | 187/290 |
| 8,022,666 | B2* | 9/2011 | Li | B60L 50/64 |
| | | | | 320/109 |
| 8,230,978 | B2* | 7/2012 | Agirman | B66B 5/027 |
| | | | | 187/290 |
| 8,789,659 | B2* | 7/2014 | Agirman | B66B 5/027 |
| | | | | 187/290 |
| 8,887,872 | B2* | 11/2014 | Chen | G01R 35/005 |
| | | | | 187/290 |
| 8,960,371 | B2* | 2/2015 | Schoenauer | B66B 5/027 |
| | | | | 187/290 |
| 9,834,406 | B2* | 12/2017 | Mezzadri | B66B 1/306 |
| 9,935,494 | B2* | 4/2018 | Rogers | B66B 1/30 |
| 10,059,563 | B2* | 8/2018 | Agirman | B66B 1/302 |
| 10,343,872 | B2* | 7/2019 | Agirman | B66B 1/302 |
| 2001/0017239 | A1* | 8/2001 | Tajima | B66B 1/30 |
| | | | | 187/290 |
| 2003/0052544 | A1 | 3/2003 | Yamamoto et al. | |
| 2009/0127029 | A1* | 5/2009 | Oesterle | B66B 5/021 |
| | | | | 187/290 |
| 2009/0236182 | A1* | 9/2009 | Yamagami | B66F 9/07531 |
| | | | | 187/222 |
| 2010/0044160 | A1* | 2/2010 | Agirman | B66B 5/027 |
| | | | | 187/290 |
| 2011/0226559 | A1* | 9/2011 | Chen | G01R 35/005 |
| | | | | 187/290 |
| 2012/0085593 | A1* | 4/2012 | Schoenauer | B66B 5/027 |
| | | | | 187/254 |
| 2012/0261217 | A1* | 10/2012 | Agirman | B66B 5/027 |
| | | | | 187/290 |
| 2015/0122589 | A1* | 5/2015 | Mezzadri | B66B 1/306 |
| | | | | 187/290 |
| 2015/0136531 | A1* | 5/2015 | Rogers | B66B 1/30 |
| | | | | 187/290 |
| 2015/0375959 | A1* | 12/2015 | Agirman | B66B 1/302 |
| | | | | 187/247 |
| 2016/0083220 | A1* | 3/2016 | Agirman | H02J 7/02 |
| | | | | 187/290 |
| 2017/0054123 | A1 | 2/2017 | Miller et al. | |
| 2017/0101291 | A1* | 4/2017 | Bogli | B66B 5/02 |
| 2017/0210596 | A1* | 7/2017 | Mezzadri | H02J 7/0021 |
| 2018/0057309 | A1* | 3/2018 | Nikander | B66B 5/0025 |
| 2018/0059189 | A1* | 3/2018 | Spielbauer | G01R 31/382 |
| 2018/0215579 | A1* | 8/2018 | Knecht | B66B 5/0031 |
| 2018/0237268 | A1* | 8/2018 | Agirman | B66B 11/043 |
| 2019/0047825 | A1* | 2/2019 | Jakes | B66B 1/302 |
| 2019/0062111 | A1* | 2/2019 | Agirman | B66B 5/028 |

\* cited by examiner

ELEVATOR

Battery based emergency power supplies are needed to power the elevator to be able to rescue people from an elevator car during sudden power outages, for example, during a sudden blackout. Typically, such devices are powered from batteries which must be replaced before the lifetime of the batteries is exceeded or otherwise there is a risk of failing the emergency rescue operation.

Batteries, especially valve regulated lead acid (VRLA) or Li-ion batteries, are prone to aging, i.e., the available capacity from a fully charged battery tends to decrease over time. Factors affecting on aging are charging and discharging cycles and temperature. For VRLA batteries, a 10° C. rise in temperature halves the expected lifetime.

Nowadays, emergency device batteries are replaced approximately every two or three years, and this replacing interval may vary depending on the environment. However, in most cases, the full capacity and lifetime of the batteries is not used. At the worst batteries are already at the end of their lifetime when emergency rescue function would be required to operate. To avoid these situations some kind of battery health or charge monitoring is needed.

It is difficult to measure the health state of a battery. An open circuit voltage measurement across battery terminals indicates a rough estimate of the state of charge of the battery. However, the health state of the battery cannot be accurately determined based on the open circuit voltage measurement, excluding the rare cases of short circuited or fully dead batteries. Some techniques which estimate the health state (or the state of charge) of the battery according to the measurement of an AC or DC resistance of the battery. As the battery ages, AC and DC resistances increase. However, this is still not a reliable indicator of the state of health by itself because of large tolerances of those resistances. There are also some methods to observe the health state of a battery during a charging process. One is to measure residual current flowing into the battery when the battery is fully charged and the charger is applying a constant float charging voltage. This method is also not accurate enough by itself.

In order to determine the functional state of a battery, there is also a method where a load is connected across the battery terminals. In some basic techniques battery testing is done by connecting a power resistor to the battery terminals for a short period of time and monitoring how much the battery terminal voltage drops. Basically, this test is very similar to DC resistance measurement and the accuracy is not sufficiently good. The test resistor has to be rated for high power which means that it is big and takes some space in the device itself. Furthermore, if the device is able to operate with different type of batteries, for example, with 12V, 24V or 48V batteries, then having a single test resistor means that battery test current differs between each battery type.

It is therefore object of the invention to provide an elevator and a method for monitoring of an emergency power supply battery which allow a reliable detection of the functional battery state and thus the issue of a replacement signal for the elevator or maintenance company.

The object is solved with an elevator according to claim 1 as well as with a method according to claim 8. Preferred embodiments of the invention are subject-matter of the dependent claims. Advantageous embodiments of the invention are also described in the description as well as in the drawings.

The basic configuration of the inventive elevator comprises an elevator control having a motor drive for an elevator motor driving an elevator car along a typically vertical movement path. The motor drive comprises a frequency converter with a rectifier bridge designed to be connected to mains, a converter bridge for feeding the elevator motor and an intermediate DC circuit located in-between them. The elevator further comprises a brake drive for supplying energy to at least one motor brake, regularly at least two motor brakes, with the brake drive being connected to the intermediate DC circuit. The elevator further comprises an emergency power supply battery designed to allow safe release of passengers in the case of a power outage. The capacity of the emergency power supply battery has therefore to be large enough to allow the drive of the elevator motor via the motor drive and the energization of the brake drive to release the motor brake.

According to the invention, the battery is connected to the intermediate DC circuit and the elevator control has a measuring circuit connected to the intermediate DC circuit. Further, the elevator control has a battery test module which is configured to apply a defined load to the battery and to measure the voltage and/or current of the DC circuit and thus of the battery itself for a defined time period. In this connection it has to be carried out that the defined time period is preferably dependent on the capacity of the battery. The time period should be chosen long enough so that at least 20% of the battery charge runs over the load applied to the intermediate DC circuit. The defined load is preferably the converter bridge in which case the semiconductor switches are controlled to allow a certain current flow between the positive and negative branch of the DC circuit. Another possibility of a load is a brake chopper in which case a chopper switch, usually a regulating semiconductor switch connected in series with the brake resistor of the brake chopper is controlled to allow a current flow via the brake resistor leading to heat dissipation in the brake resistor. A third possibility for a load is the connection of the brake drive which energizes at least one, preferably one of the motor brakes so that the current flows into the brake coil releasing the brake. In this case, preferably, only one of the brakes of the regularly two motor brakes is energized so that the other motor brake holds the elevator car during the battery test process. Of course, the above-mentioned three alternative loads may be used in combination with each other.

Figure 2:
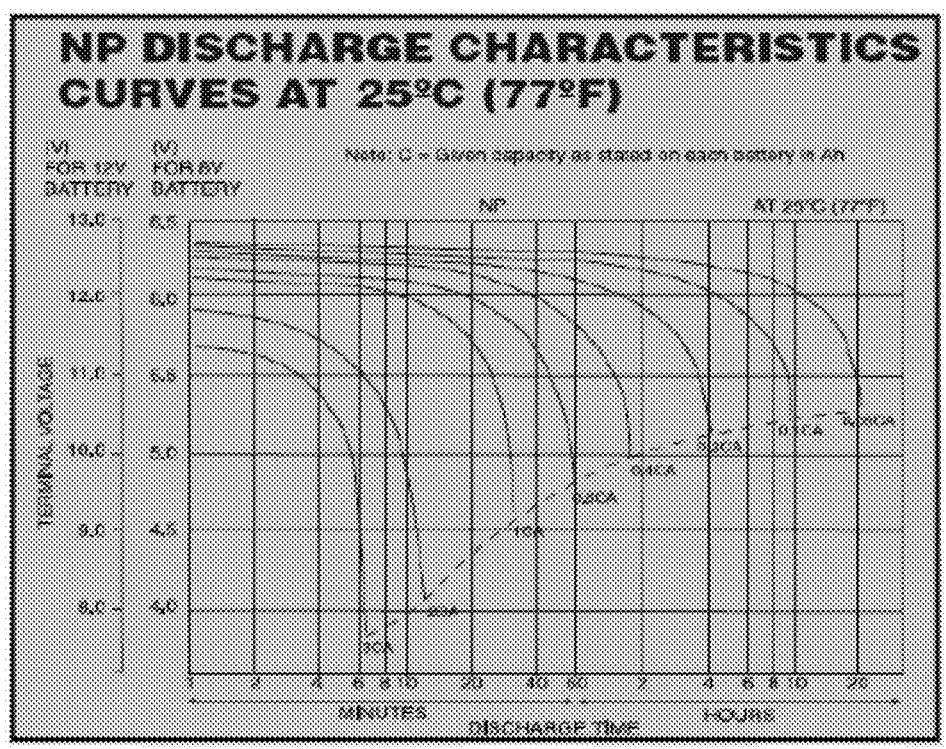

Further, the battery testing module comprises a comparator for comparing the measured voltage and/or current and/or power with at least one stored first threshold value, whereby the elevator control is configured to issue a replacement signal for the battery dependent on the signal of the comparator. From the measurement of the current flowing between the battery terminals and thus between the positive and negative branch of the intermediate DC circuit as well as the voltage it is easily possible to calculate the power discharged during the measurement. The power can be set in relation to the nominal capacity of the battery and thus the measuring time can be defined to be a fixed portion of the capacity, e.g. 20%. Via the measurement of the voltage over the time a voltage profile is obtained which can be compared with the voltage profiles over the health state as it is shown in FIG. 2. By a comparison of the voltage curve with these voltage profiles stored as a reference value the health state of the battery can be reliably retrieved, and if the current profile exceeds a certain threshold profile, which could be e.g. 70% remaining capacity, a battery replacement signal is issued. If the profile exceeds a further lower threshold value, which could be e.g. 50% remaining capacity, the elevator may be taken out of order by the elevator control as this remaining capacity may be insufficient to release trapped passengers.

In summary, the invention offers the use of a load realized by components of the motor and brake drive which are obligatory in an elevator system, as e.g. the converter bridge being controlled to connect the positive and negative branch of the intermediate DC circuit, the brake drive energizing a motor brake coil, or the brake chopper to allow a current flow between the positive and negative branch of the DC circuit leading to a dissipation of the energy in the brake resistor of the brake chopper. Therefore, no separate battery test load has to be applied or provided in the inventive elevator. Furthermore, the fact that the voltage is monitored over a defined longer time period of several seconds, preferably up to five minutes, most preferably from 30 seconds, advantageously from one minute to three minutes, ensures that the functional battery status is reliably determined. The defined time period is thereby preferably dependent on the circumstances of current flow between the positive and negative branch of the intermediate DC circuit as well as on the rated capacity of the battery to be tested. Preferably, the defined time period is set to a value that allows at least 20% of the rated battery power flowing through the load connected to the intermediate DC circuit.

The invention provides the best and most straightforward test method is to apply a test load that has equivalent power adapted to the power of an emergency rescue device. The discharge time should be advantageously so long that at least 80% state of charge is reached. This is because the battery voltage starts to drop more rapidly as the state of charge is decreased. It is very difficult to tell the difference between good and bad battery if we can only monitor the beginning of the discharge curve, which is shown in FIG. 2.

In one preferred embodiment of the invention, a battery pack of an emergency power supply consists of 4 pieces of 12V 12 Ah VRLA batteries connected in series. They are being discharged approximately at the rate of 24 . . . 36 A. This means that they will last only for about ten minutes. In terms of power the batteries are discharged via the emergency rescue device, e.g. via energizing the elevator motor to move the car and energizing the motor brakes to release the car with a power requirement of about 1.5 kW. In order to make a battery test preferably this nominal power of the emergency rescue device should be used. The load connected to the battery should therefore in the above case preferably lead to a power consumption of 1.5 kW. The defined measuring time should proceed until the charge of the battery has dropped to about 80%. Thus, in general cases the battery is discharged with a load leading to a power consumption of 1.5 kW for 2 minutes.

The emergency power supply may advantageously also consist of Li-ion batteries which have a high efficiency and only need minor space for installation.

In a preferred embodiment the invention works as follows:

Batteries are connected to the emergency braking device which is galvanically connected to the intermediate circuit of the motor drive using relays. The emergency braking device and the motor drive communicate with each other using a serial-link or a parallel interface.

The fact that batteries are directly connected to drive intermediate DC-circuit enables a facilitated battery testing using existing components of the motor and/or brake without the necessity to use a dedicated battery test resistor. The test load can be applied to the battery by opening one brake with brake controller,
supplying power to the motor without creating torque or using brake chopper to load the battery.

If the motor drive or brake drive are being used the elevator safety chain has to be closed. The emergency braking device can request a battery test from the motor drive which then forwards this request to elevator control. If the elevator safety chain is closed, then elevator control can request that the safety inputs for the motor and brake drive to be closed allowing the motor drive to open, i.e. to energize the motor brakes or to supply power to the motor to apply the load between the positive and negative branch of the intermediate DC circuit and thus to the battery itself. If the motor and brake drive is ready to control the brakes or to supply power to the motor, then it will respond a 'ready condition' to the emergency braking device which can then connect battery to the drive intermediate circuit by closing the relays. And then, the emergency braking device can request how much power shall be drawn from the batteries to perform the battery test. During the battery test, the emergency braking device will monitor the battery terminal voltage and the current flow and decide if the battery is in good condition or not via comparison with reference or threshold values. In case battery needs replacement, the emergency braking device will inform the motor drive as well as the elevator control to issue a replacement signal. In the worst case the elevator is prohibited from being taken into use.

If a braking chopper is used, then there is no need to communicate with elevator controller. Instead, the motor and brake drive itself can control a braking chopper semiconductor switch to supply power to braking resistor.

The advantages of the invention comprise i.e.:
If the battery is being used rarely the battery replacement interval can be increased using condition-based maintenance.
The batteries can be replaced as soon as usable battery lifetime has been exceeded.
More sophisticated type of battery testing will avoid causing unnecessary request to replace batteries.
Bulky battery test resistors can be avoided.

In a preferred embodiment of the invention, the elevator control comprises a power or current monitoring device and the elevator control is configured to disable the measurement circuit in the connection of the load after the measured power or current during the voltage measurement exceeds a certain second threshold value. With these features it can be ensured that the time period is long enough so that a certain amount of current or power is flowing during the voltage measurement which enables a quite reliable information about the real status of the battery.

Preferably, the second threshold value is dependent on the rated capacity of the battery. This allows the setting of the time period to an exact value portion of the rated capacity of the battery. For example, the status of a battery can be determined the better the longer the voltage measurement takes whereby at least 20% of the battery charge should be flowing via the load during the measurement. The measurement of the profile of the voltage drop in the above sense allows information about the functional battery status. The initial voltage measurement with full charge battery is not a very reliable value for the battery status. Therefore, according to the invention, the voltage of the battery is measured over the remaining battery capacity which better considers the natural voltage behaviour of a battery during discharge.

Such a behaviour is indicated in FIG. 2 where the profile of the battery terminal voltage is shown via the discharge time for different health states of the battery and thus via the really remaining functional battery capacity. It can be clearly seen that the voltage drop in each profile clearly takes place only after a certain time period which ensures that at least an essential portion of the battery charge, preferably at least 20% of the battery charge, is discharged so that 80% of the rated battery charge remain at the most. With recording this initial discharge profile of the battery the health state of the battery is reliably tested.

In a preferred embodiment of the invention, the measuring circuit is configured to disable the elevator motor and to ensure that at least one of the motor brakes is de-energized. Via this measure it can be ensured that the elevator is kept in place during the voltage measurement. Accordingly, the battery test does not affect the security of the elevator. Accordingly the elevator control may communicate with an elevator safety controller to ensure stop of the elevator car during the battery test.

In a preferred embodiment of the invention, the elevator is a traction sheave elevator and the elevator motor drives a traction sheave which co-acts with elevator ropes connected to the elevator car. This type of elevator is most convenient and comprises the components mentioned above. Of course, the invention also works with a toothed belt as suspension means for the car and counterweight, in which case the drive sheave connected to the elevator motor combs the toothed belt.

Preferably, the battery is a valve regulated lead acid battery (VRLA). This type of battery has the discharge behaviour which is depicted in FIG. 2. Accordingly, the inventive elevator and monitoring method for the battery is preferably designed for said type of battery which on the other hand provides enough capacity to allow at least a short time run of the elevator motor and the simultaneous release of the motor brakes. In this case it is to be mentioned that the windings of the motor brakes have to be energized to allow the motor brakes to be released. This is a safety measure obligatory in elevator regulations around the world.

The present invention also refers to a method for monitoring an emergency power supply battery in an elevator comprising an elevator control having a motor drive of an elevator motor, driving an elevator car on a movement path. The motor drive comprises a frequency converter with a rectifier bridge designed to be connected to mains, a converter bridge for feeding the elevator motor and an intermediate DC circuit located in-between. The elevator further comprises a brake drive for supplying energy to at least two motor brakes which are required by regulations. The brake drive is also connected to the intermediate DC circuit. Finally, the elevator comprises an emergency power supply battery for allowing the release of trapped passengers during a power outage.

According to the inventive method, the function of the battery is tested by connecting it for a certain time period to a load connected to the intermediate DC circuit to which also the battery is connected. The load may be
- a brake chopper,
- the energization of at least one of the motor brakes via the brake drive or
- the control of at least some semiconductor switches of the converter bridge to be leading between the two branches of the intermediate DC circuit.

The elevator control has a measuring circuit connected to the intermediate DC circuit. As current is flowing via the load between the positive and negative branch of the intermediate DC circuit, a voltage drop is measured whereby the voltage drop is measured for a defined time period. The measured voltage is compared with at least one stored first threshold value, whereby a replacement signal for the battery is issued when the threshold value is exceeded.

The first threshold value is for example a discharge curve over the time which is present when the capacity of the battery has gone down to for example 70% of the rated load. The drop of the battery capacity to this value is then deemed as a signal for a battery replacement. The monitoring of the actual remaining battery capacity is based on the measurement of the voltage drop over the defined time period which time period is selected so that an essential amount of the battery charge is dissipated over the load, preferably at least 20%, most preferably up to 40%. Accordingly, the invention provides a very reliable tool for replacing a battery which capacity has dropped to an extent so that the performance of a safety run of the elevator car to release trapped passengers is no longer ensured.

In a preferred embodiment of the method, during the voltage measurement, the power dissipation over the load or the current flowing over the load is measured and the time period is defined by the amount of power or current exceeding a predetermined second threshold value which is a portion of the rated capacity of the battery. The time period can therefore be defined by the power or current flow in relation to the rated battery capacity. This allows the voltage measurement until a certain portion of the battery capacity is dissipated via the load. Preferably, this portion is at least 10%, preferably 15%, or at least 20%, most preferably at least 25%.

The inventive method could also be described that the initial discharge profile of the battery of at least 10%, preferably at least 15%, most preferably at least 20% of the rated battery capacity is recorded and compared with at least one reference profiles of the battery for a defined health state, e.g. 70% remaining functional capacity as first threshold or reference value.

It shall be clear for the skilled person that the above-mentioned embodiments of the invention can be combined arbitrarily.

The invention is described hereinafter by means of an example in the annexed drawings. In these drawings:

FIG. 1 shows a schematic diagram of a part of the inventive elevator, and

FIG. 2 a battery discharge curve of a valve regulated lead acid battery with the terminal voltage of the battery over the discharge time for different functional battery states.

FIG. 1 shows a part of an elevator 10 comprising an elevator control 12 having three optional microprocessor parts 12a, 12b and 12c.

The elevator further comprises a motor and brake drive 14 as well as an battery testing module 15 comprising an emergency power supply battery 16, e.g. a VLRA or Li-ion battery.

The motor and brake drive 14 comprises a motor drive 17 with rectifier bridge 18 connected to mains 20 via a separator switch 22 controlled by the elevator control 12. Further, the motor drive 17 comprises a converter bridge 24 which converter bridge 24 is connected to the rectifier bridge 18 via an intermediate DC circuit 25. The converter bridge 24 is in drive connection to the elevator motor 26.

The motor and brake drive 14 further comprises a brake drive 28 which is connected to the intermediate DC circuit 25 of the motor drive 17 optionally via a DC/DC inverter 30. The brake drive 28 controls two motor brakes 32a,b. The battery 16 of the battery testing module is connected to the intermediate DC circuit 25 via a safety switch 34 which is controlled via a microprocessor part 12*c* of the elevator control 12.

The motor and brake drive 14 further comprises a part 12*b* of the elevator control as well as a brake chopper 36 which comprises a brake resistor 38 connected in series with a semiconductor chopper switch 40 controlled by the elevator control 12.

The battery testing module 15 comprises a measuring circuit 44 with a shunt 42 for current measurement. The measuring circuit measures via the third microprocessor part 12*c* of the elevator control 12 the voltage and current flowing during the measurement, which allows the determination of the power flow during the measurement.

The invention works as follows:

In case the elevator 10 is not used and the elevator control 12 requires the performing of a functional battery test, the elevator control 12 opens via the first microprocessor part 12*a* in connection with separator switch 22 the connection between the rectifier bridge 18 and mains 20. Furthermore, the elevator motor is de-energized and at least one of the motor brakes is de-energized to keep it in gripping position.

The elevator control or a part of it connects the load, e.g. the brake resistor 38 and/or switches of the converter bridge 24 and/or the motor brake 32*a,b* between the positive and negative branch of the intermediate DC circuit 25, and the third microprocessor part 12*c* of the elevator control 12 closes the safety switch 34 to connect the battery 16 with the intermediate DC circuit 25. Simultaneously the measuring circuit 44 is activated to measure the current flow as well as the voltage over the battery terminals. Via this measure the power consumed during the measurement is calculated. The measurement is performed over a defined time period which calculates e.g. by a power amount corresponding to 20% of the rated battery capacity. Thus, an essential part of the discharge profile of the battery is measured which allows exact information about the functional or health state of the battery. The measured profile is e.g. compared with stored profiled according to FIG. 2 to obtain the health state of the battery. If the detected state exceeds a first threshold value, e.g. only 70% of the rated capacity left, a replacement signal is issued by the elevator control, e.g. to a remote maintenance center of the elevator or to another monitoring facility of the elevator company, maintenance company or building owner.

Preferably, the elevator control comprises on this behalf a memory with the values of the discharge profiled as shown in FIG. 2 as reference values. By comparing the voltage drop in correlation to the discharged power, it is therefore able to reliably give an estimation about the remaining actual capacity of the battery and of course about the necessity of a replacement of the battery. Accordingly, the elevator control may if the first threshold values according to the discharge characteristics are exceeded issue a replacement signal.

It is optionally furthermore possible that after the third microprocessor part of the elevator control realizes a capacity loss which affects the usability of the battery it triggers for example the elevator safety circuit to set the elevator out of operation and issue a maintenance signal.

The microprocessor parts 12*a*, 12*b*, 12*c* of the elevator control are used for clarity reasons in the drawings and are optional. The corresponding components can be directly connected to the elevator control. At least parts of the battery testing module and of the elevator control may be realised or organized in an emergency rescue device of the elevator control. Different modules and components of the elevator control may be integrated or provided as separate components. The motor drive and brake drive can be realized in separate devices.

The described embodiment should not be understood as limiting the invention but the invention can be carried out within the scope of the appended patent claims.

LIST OF REFERENCE NUMERALS

10 elevator
12 elevator control
12 *a, b, c* microprocessor parts of the elevator control
14 motor and brake drive
15 battery testing module
16 battery (VRLA)
17 motor drive (frequency converter)
18 rectifier bridge
20 mains (public AC source)
22 separator switch
24 converter bridge
25 intermediate DC circuit
26 elevator motor
28 brake drive (brake controller)
30 DC/DC coupler (optional)
32*a,b* motor brakes
34 safety switch of the battery testing module
36 brake chopper
38 brake resistor
40 chopper switch (semiconductor switch)
42 measurement resistor for current measurement
44 measuring circuit

The invention claimed is:

1. An elevator comprising:
    an elevator control having a motor drive of an elevator motor driving an elevator car on a movement path, the motor drive including,
        a frequency converter with a rectifier bridge configured to be connected to mains,
        a converter bridge for feeding the elevator motor, and
        an intermediate DC circuit located in-between,
    the elevator further comprising a brake drive for supplying energy to at least one motor brake, the brake drive being connected to the intermediate DC circuit as well as an emergency power supply battery designed to allow safe release of passengers in case of a power outage,
    wherein the battery is connected to the intermediate DC circuit, and
    wherein the elevator control includes a measuring circuit connected to the intermediate DC circuit; and
    wherein the elevator control includes a battery testing module configured to apply a defined load to the battery and to measure the voltage of the DC circuit for a defined time period, the battery testing module having a comparator for comparing the measured voltage with at least one stored first threshold value, whereby the elevator control is configured to issue a replacement signal for the battery dependent on the signal of the comparator.

2. The elevator according to claim 1, wherein the load is the converter bridge controlled in a conducting state and/or the brake drive energizing a brake and/or a brake chopper.

3. The elevator according to claim 2, wherein the elevator is a traction sheave elevator and the elevator motor drives a traction sheave which co-acts with elevator ropes connected to the elevator car.

4. An elevator comprising an elevator control having a motor drive of an elevator motor driving an elevator car on a movement path, which motor drive comprising a frequency converter with a rectifier bridge designed to be connected to mains, a converter bridge for feeding the elevator motor and an intermediate DC circuit located in-between, the elevator further comprising a brake drive for supplying energy to at least one motor brake with the brake drive being connected to the intermediate DC circuit as well as an emergency power supply battery designed to allow safe release of passengers in case of a power outage,
    wherein the battery is connected to the intermediate DC circuit, and that the elevator control has a measuring circuit connected to the intermediate DC circuit and that the elevator control has a battery testing module which is configured to apply a defined load to the battery and to measure the voltage of the DC circuit for a defined time period,
    the battery testing module comprises a comparator for comparing the measured voltage with at least one stored first threshold value, whereby the elevator control is configured to issue a replacement signal for the battery dependent on the signal of the comparator; and
    wherein the elevator control comprises a power and/or current monitoring device, and that the elevator control is configured to disable the measuring circuit after the measured current/power during the voltage measurement exceeds a certain second threshold value.

5. The elevator according to claim 4, wherein the second threshold value is dependent on the rated capacity of the battery, preferably at least 10%, advantageously 15%, most preferably at least 20% of the rated battery capacity.

6. The elevator according to claim 5, wherein the measuring circuit is configured to disable the elevator motor and to ensure that at least one of the motor brakes is de-energized.

7. The elevator according to claim 4, wherein the measuring circuit is configured to disable the elevator motor and to ensure that at least one of the motor brakes is de-energized.

8. The elevator according to claim 4, wherein the elevator is a traction sheave elevator and the elevator motor drives a traction sheave which co-acts with elevator ropes connected to the elevator car.

9. The elevator according to claim 4, wherein the battery is a valve regulated lead acid battery or a Li-ion battery.

10. The elevator according to claim 4, wherein the elevator control comprises a power and/or current monitoring device, and that the elevator control is configured to disable the measuring circuit after the measured current/power during the voltage measurement exceeds a certain second threshold value.

11. The elevator according to claim 4, wherein the measuring circuit is configured to disable the elevator motor and to ensure that at least one of the motor brakes is de-energized.

12. The elevator according to claim 4, wherein the measuring circuit is configured to disable the elevator motor and to ensure that at least one of the motor brakes is de-energized.

13. A method for monitoring an emergency power supply battery in an elevator, the elevator including an elevator control having a motor drive of an elevator motor driving an elevator car on a movement path, which motor drive includes a frequency converter with a rectifier bridge designed to be connected to mains, a converter bridge for feeding the elevator motor and an intermediate DC circuit in-between, the elevator further including a brake drive for supplying energy to at least one motor brake with the brake drive being connected to the intermediate DC circuit as well as the emergency power supply battery, comprising:
    testing the battery by connecting the battery for a defined time period to a load connected to the intermediate DC circuit, the load being the converter bridge controlled in a conducting state and/or a brake chopper controlled to be connected to the DC intermediate circuit, and
    using a measuring circuit connected to the intermediate DC circuit to measure the battery by measuring, the voltage over the DC circuit for the defined time period to determine loaded battery voltage, and
    comparing the measured voltage with at least one stored first threshold value, and issuing a replacement signal for the battery when the threshold value is exceeded.

14. The method according to claim 13 wherein at least one of the motor brakes is kept de-energized during the voltage measurement.

15. The method according to claim 13, wherein during the voltage measurement a separation switch is activated to separate the rectifier bridge from mains.

16. A method for monitoring an emergency power supply battery in an elevator comprising an elevator control having a motor drive of an elevator motor, driving an elevator car on a movement path, which motor drive comprising a frequency converter with a rectifier bridge designed to be connected to mains, a converter bridge for feeding the elevator motor and an intermediate DC circuit in-between, the elevator further comprises a brake drive for supplying energy to at least one motor brake with the brake drive being connected to the intermediate DC circuit as well as the emergency power supply battery,
    wherein the function of the battery is tested by connecting it for a certain time period to a load connected to the intermediate DC circuit, and that the elevator control has a measuring circuit connected to the intermediate DC circuit, which load is the converter bridge controlled in a conducting state and/or the bake drive energizing a brake and/or a brake chopper controlled to be connected to the DC intermediate circuit, that the voltage over the DC circuit is measured for a defined time period,
    and that the measured voltage is compared with at least one stored first threshold value, whereby a replacement signal for the battery is issued when the threshold value is exceeded,
    wherein during the voltage measurement the power dissipation over the load is measured and the time period is defined by integrating the dissipated power over the time and the voltage measurement is stopped when the integral exceeds a predetermined second threshold value.

17. The method according to claim 16, wherein the second threshold value is at least 10%, preferably at least 15%, most preferably at least 20% of the rated battery capacity.

18. The method according to claim 16, wherein the intermediate DC circuit has two branches and the measuring circuit measures the voltage of the intermediate DC circuit as well as the current flow between the two branches of the intermediate DC circuit.

19. The method according to claim 16, wherein the initial discharge profile of the battery of at least 10%, preferably at least 15%, most preferably at least 20% of the rated battery capacity is recorded and compared with at least one reference profiles of the battery for a defined health state, e.g. 70% remaining functional capacity.

20. The method according to claim 16 performed in an elevator comprising an elevator control having a motor drive of an elevator motor driving an elevator car on a movement path, which motor drive comprising a frequency converter with a rectifier bridge designed to be connected to mains, a converter bridge for feeding the elevator motor and an intermediate DC circuit located in-between, the elevator further comprising a brake drive for supplying energy to at least two motor brakes with the brake drive being connected to the intermediate DC circuit as well as an emergency power supply battery designed to allow safe release of passengers in case of a power outage,
    wherein the battery is connected to the intermediate DC circuit, and that the elevator control has a measuring circuit connected to the intermediate DC circuit and that the elevator control has a battery testing module which is configured to apply a defined load to the battery and to measure the voltage of the DC circuit for a defined time period,
    and that the battery testing module comprises a comparator for comparing the measured voltage with at least one stored first threshold value, whereby the elevator control is configured to issue a replacement signal for the battery dependent on the signal of the comparator.

* * * * *